United States Patent
Hmelar et al.

[11] Patent Number: 6,164,743
[45] Date of Patent: Dec. 26, 2000

[54] INK CONTAINER WITH AN INDUCTIVE INK LEVEL SENSE

[75] Inventors: Susan M. Hmelar, Corvallis; James E. Clark, Albany; Eric L. Gasvoda, Salem; Norman E. Pawlowski, Jr., Corvallis, all of Oreg.; Juan-Antonio Sabate Saumell, Yorktown Heights, N.Y.; Rhonda L. Wilson, Monmouth, Oreg.; James M. Cameron, Los Altos, Calif.; Steven B. Elgee, Portland, Oreg.

[73] Assignee: Hewlett-Packard Company, Palo Alto, Calif.

[21] Appl. No.: 08/869,240

[22] Filed: Jun. 4, 1997

Related U.S. Application Data

[63] Continuation-in-part of application No. 08/633,613, Apr. 17, 1996, abandoned.

[51] Int. Cl.⁷ .............................. B41J 2/195; B41J 2/175
[52] U.S. Cl. .................................... 347/7; 347/86
[58] Field of Search .................... 347/7, 85–87; 73/290 R, 304 R, 304 C; 340/618, 620

[56] References Cited

U.S. PATENT DOCUMENTS

| | | | |
|---|---|---|---|
| 4,354,382 | 10/1982 | Hagglund | 73/290 R |
| 4,415,886 | 11/1983 | Kyogoku et al. | 340/618 |
| 4,446,562 | 5/1984 | Friedmann et al. | 373/149 |
| 4,568,954 | 2/1986 | Rosback | 346/140 R |
| 4,700,754 | 10/1987 | Kringe | 141/95 |
| 5,051,921 | 9/1991 | Paglione | 364/509 |
| 5,583,545 | 12/1996 | Pawlowski, Jr. et al. | 347/7 |

FOREIGN PATENT DOCUMENTS

| | | | |
|---|---|---|---|
| 3043810A | 6/1982 | Germany | B41J 2/175 |
| 3422504A | 1/1986 | Germany . | |
| 2312283A | 10/1997 | United Kingdom . | |

OTHER PUBLICATIONS

Patent Abstracts of Japan, vol. 013, No. 197 (P–868), May 11, 1989 & JP 01 018087 A, (Toshiba Corp.), Jan. 20, 1989.

Copy of EPO Search Report, dated Sep. 02, 1998, from application EP 98 10 3479.

*Primary Examiner*—John Barlow
*Assistant Examiner*—Craig A. Hallacher
*Attorney, Agent, or Firm*—Manuel Quiogue

[57] ABSTRACT

An ink container that includes a collapsible ink reservoir having first a side and a second side that are opposing, a first spiral conductive coil attached to the first side, a second spiral conductive coil attached to the second side, stiffeners disposed over the first and second coils, and a pressure vessel for pressurizing the outside of the ink reservoir.

28 Claims, 10 Drawing Sheets

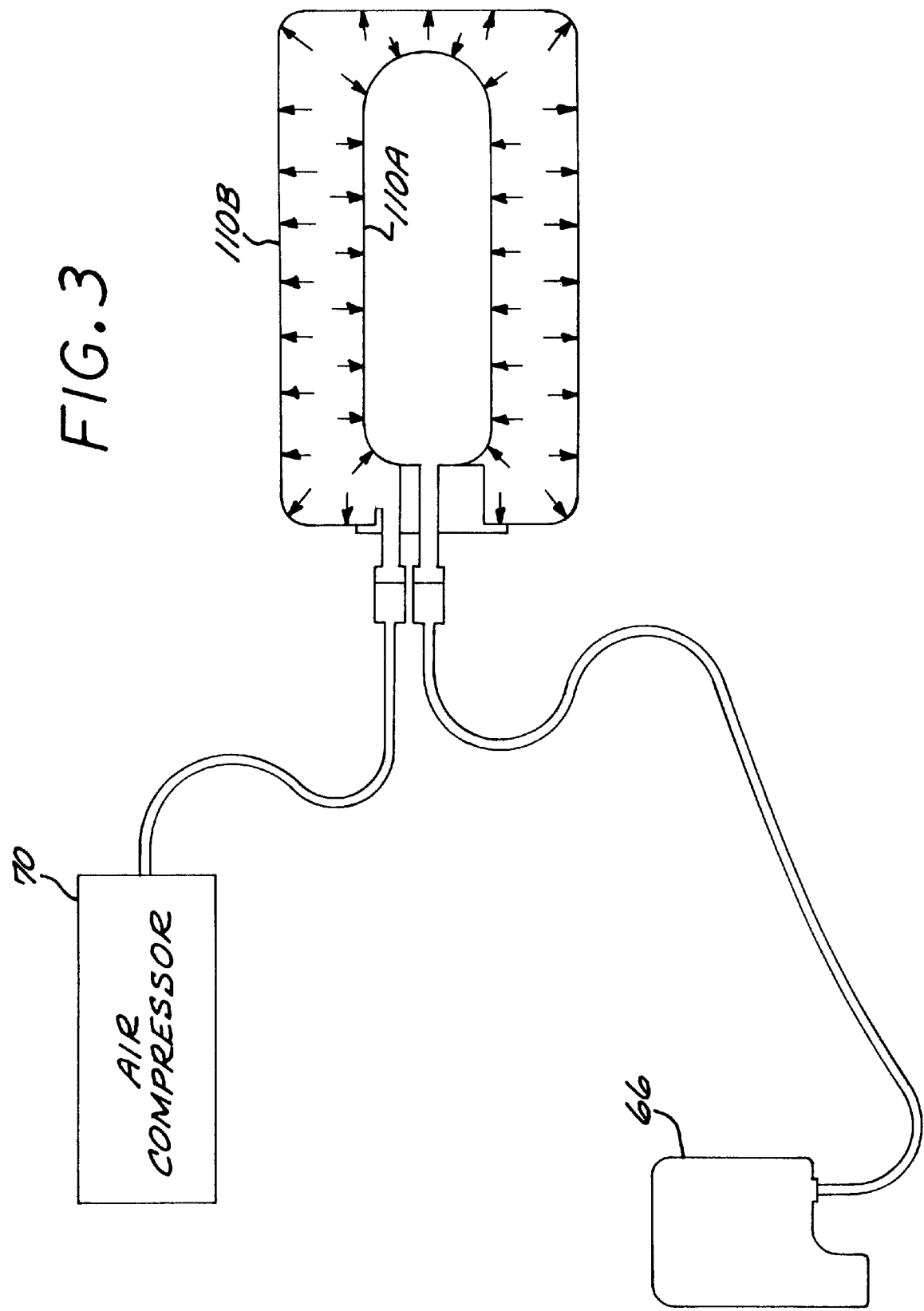

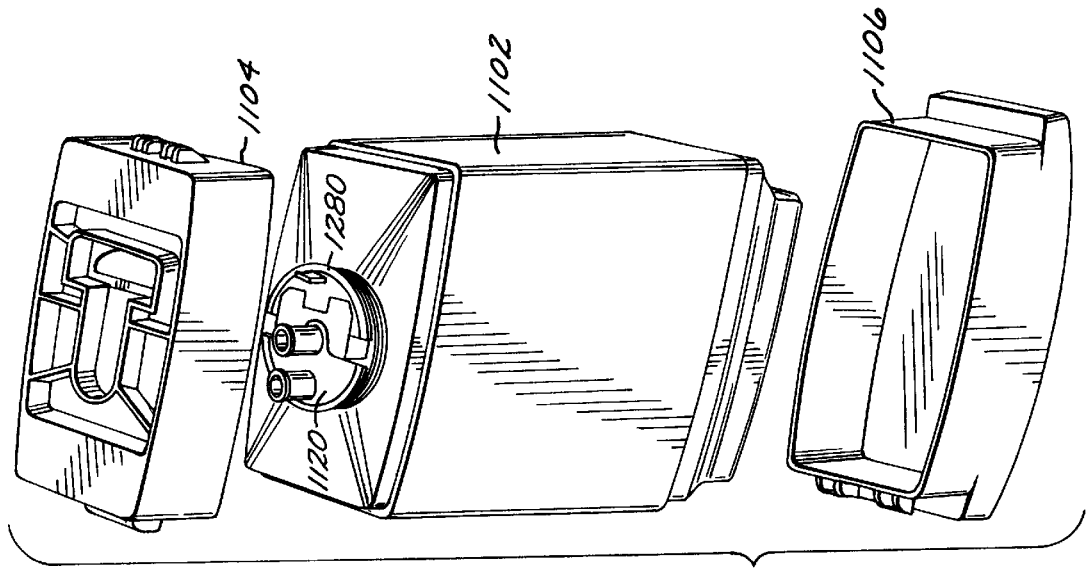
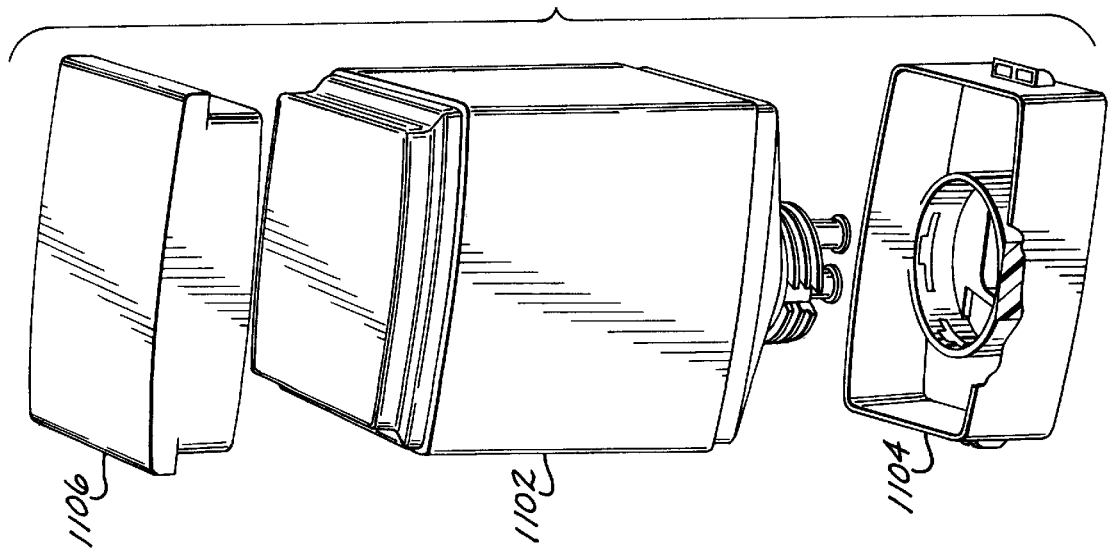
FIG. 6
FIG. 7

INK CONTAINER WITH AN INDUCTIVE INK LEVEL SENSE

This is a continuation-in-part of U.S. Ser. No. 08/633,613, filed Apr. 17, 1996, entitled "Inductive Ink Level Detection Mechanism For Ink Supplies", incorporated herein by reference.

This application is also related to commonly assigned co-pending U.S. Ser. No. 08/869,038, filed herewith, entitled "Electrical Interconnect for Replaceable Ink Containers", incorporated herein by reference; commonly assigned co-pending U.S. Ser. No. 08/869,150, filed herewith, entitled "Method and Apparatus for Securing an Ink Container", incorporated herein by reference; commonly assigned co-pending U.S. Ser. No. 08/871,566, filed herewith, entitled "Replaceable Ink Container Adapted To Form Reliable Fluid, Air And Electrical Connection To A Printing System", incorporated herein by reference; commonly assigned co-pending U.S. Ser. No. 08/869,122, filed herewith, entitled "Ink Level Estimation Using Drop Count and Ink Level Sense", incorporated herein by reference; commonly assigned co-pending U.S. Ser. No. 08/867,773, filed herewith, entitled "Ink Container Providing Pressurized Ink With Ink Level Sensor", incorporated herein by reference; commonly assigned co-pending U.S. Ser. No. 08/868,927, filed herewith, entitled "An Ink Container Having a Multiple Function Chassis", incorporated herein by reference; commonly assigned co-pending U.S. Ser. No. 08/869,023, filed herewith, entitled "High Performance Ink Container with Efficient Construction", incorporated herein by reference; and commonly assigned co-pending U.S. Ser. No. 08/785,580, filed Jan. 21, 1997, entitled "Apparatus Controlled by Data from Consumable Parts with Incorporated Memory Devices", incorporated herein by reference.

BACKGROUND OF THE INVENTION

The disclosed invention relates to ink jet printing systems that employ replaceable consumable parts including ink cartridges, and more particularly to mechanisms for estimating the amount of ink remaining in an ink cartridge.

The art of ink jet printing is relatively well developed. Commercial products such as computer printers, graphics plotters, and facsimile machines have been implemented with ink jet technology for producing printed media. Generally, an ink jet image is formed pursuant to precise placement on a print medium of ink drops emitted by an ink drop generating device known as an ink jet printhead. Typically, an ink jet printhead is supported on a movable carriage that traverses over the surface of the print medium and is controlled to eject drops of ink at appropriate times pursuant to command of a microcomputer or other controller, wherein the timing of the application of the ink drops is intended to correspond to a pattern of pixels of the image being printed.

Some known printers make use of an ink container that is separably replaceable from the printhead. When the ink container is exhausted it is removed and replaced with a new ink container. The use of replaceable ink containers that are separate from the printhead allow users to replace the ink container without replacing the printhead. The printhead is then replaced at or near the end of printhead life, and not when the ink container is replaced.

A consideration with ink jet printing systems that employ ink containers that are separate from the printheads is the general inability to predict an out of ink condition for an ink container. In such ink jet printing systems, it is important that printing cease when an ink container is nearly empty with a small amount of stranded ink. Otherwise, printhead damage may occur as a result of firing without ink, and/or time is wasted in operating a printer without achieving a complete printed image, which is particularly time consuming in the printing of large images which often are printed in an unattended manner on expensive media.

A known approach to estimating remaining ink volume involves immersing electrodes in an ink volume and measuring a resistance path through the ink. Considerations with this approach include the complexity of incorporating electrodes in an ink container, and the variation of electrical properties with ink formulation.

SUMMARY OF THE INVENTION

The invention is generally employed in an ink level detection system that includes a collapsible ink container having first a side and a second side that are opposing; a first inductive coil attached to the first side, the first inductive coil having a first coil area and first and second terminals; and a second inductive coil attached to the second side, the second inductive coil having a second coil area and first and second terminals.

In accordance with one aspect of the invention, the second coil area is greater than the first coil area.

In accordance with another aspect of the invention, the first and second sides of the ink reservoir include relatively stiff regions adjacent to the first and second coils.

In accordance with a further aspect of the invention, the number of turns of the second coil is greater than the number of turns of the first coil.

In accordance with yet a further aspect of the invention, a pressure vessel is provided for pressurizing the outside of the ink reservoir.

BRIEF DESCRIPTION OF THE DRAWINGS

The advantages and features of the disclosed invention will readily be appreciated by persons skilled in the art from the following detailed description when read in conjunction with the drawing wherein:

FIG. 3 is a schematic block diagram illustrating in a simplified manner the connection between an off-carriage ink container, an air pressure source, and an on-carriage print cartridge of the printer/plotter system of FIG. 1.

FIG. 6 is a schematic isometric exploded view illustrating the major components of an implementation of one of the ink containers of the printer/plotter system of FIG. 1 which employs an ink level sensing circuit in accordance with the invention.

FIG. 7 is a further schematic isometric exploded view illustrating the major components of an implementation of one of the ink containers of the printer/plotter system of FIG. 1 which employs an ink level sensing circuit in accordance with the invention.

DETAILED DESCRIPTION OF THE DISCLOSURE

Figure 1:
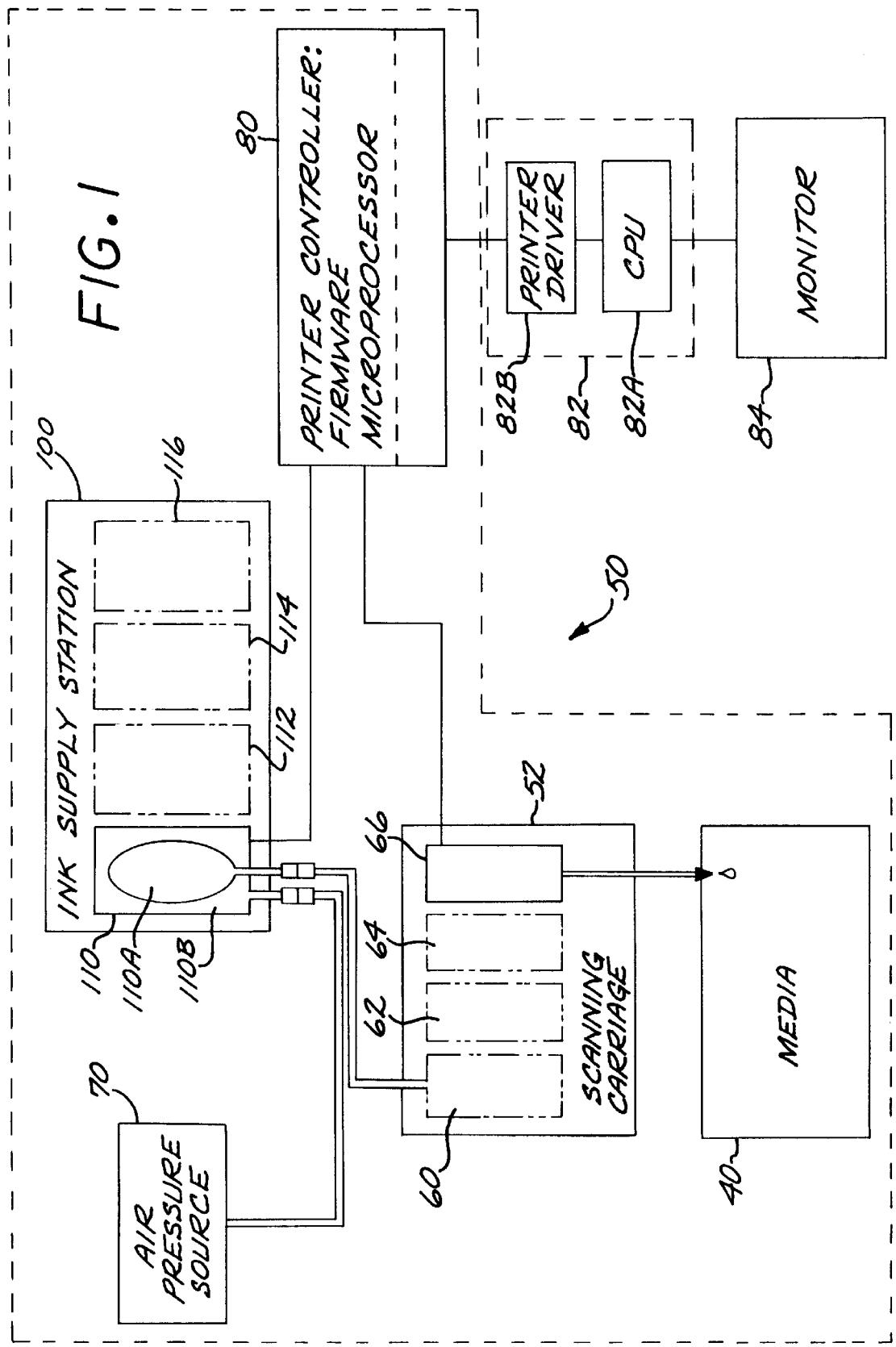
FIG. 1 is a schematic block diagram of a printer/plotter system in which an ink level sensing circuit in accordance with the invention can be employed.

In the following detailed description and in the several figures of the drawing, like elements are identified with like reference numerals.

Figure 2:
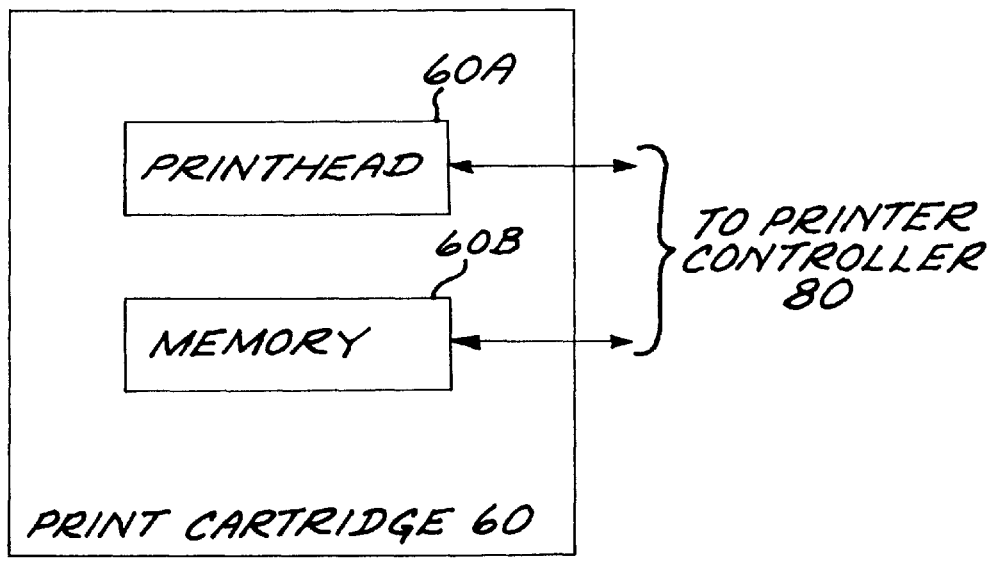
FIG. 2 is a schematic block diagram depicting major components of one of the print cartridges of the printer/plotter system of FIG. 1.

Referring now to FIG. 1, set forth therein is a schematic block diagram of a printer/plotter 50 in which the invention can be employed. A scanning print carriage 52 holds a plurality of print cartridges 60–66 which are fluidically coupled to an ink supply station 100 that supplies pressurized ink to the print cartridges 60–66. By way of illustrative example, each of the cartridges 60–66 comprises an ink jet printhead and an integral printhead memory, as schematically depicted in FIG. 2 for the representative example of the print cartridge 60 which includes an ink jet printhead 60A and an integral printhead memory 60B. Each print cartridge has a fluidic regulator valve that opens and closes to maintain a slight negative gauge pressure in the cartridge that is optimal for printhead performance. The ink provided to each of the cartridges 60–66 is pressurized to reduce the effects of dynamic pressure drops.

The ink supply station 100 contains receptacles or bays for accepting ink containers 110–116 which are respectively associated with and fluidically connected to respective print cartridges 60–66. Each of the ink containers 110–114 includes a collapsible ink reservoir, such as collapsible ink reservoir 110A that is surrounded by an air pressure chamber 110B. An air pressure source or pump 70 is in communication with the air pressure chamber for pressurizing the collapsible ink reservoir. For example, one pressure pump supplies pressurized air for all ink containers in the system. Pressurized ink is delivered to the print cartridges by an ink flow path that includes for example respective flexible plastic tubes connected between the ink containers 110–116 and respectively associated print cartridges 60–66.

FIG. 3 is a simplified diagrammatic view illustrating the pressure source 70, the print cartridge 66, and the collapsible ink reservoir 110a and pressure chamber 110B. During idle periods, the pressure chamber 110B (which is defined by a pressure vessel, as more particularly described herein) is allowed to de-pressurize. Also, the ink containers 110–116 are not pressurized during shipment.

Figure 4:
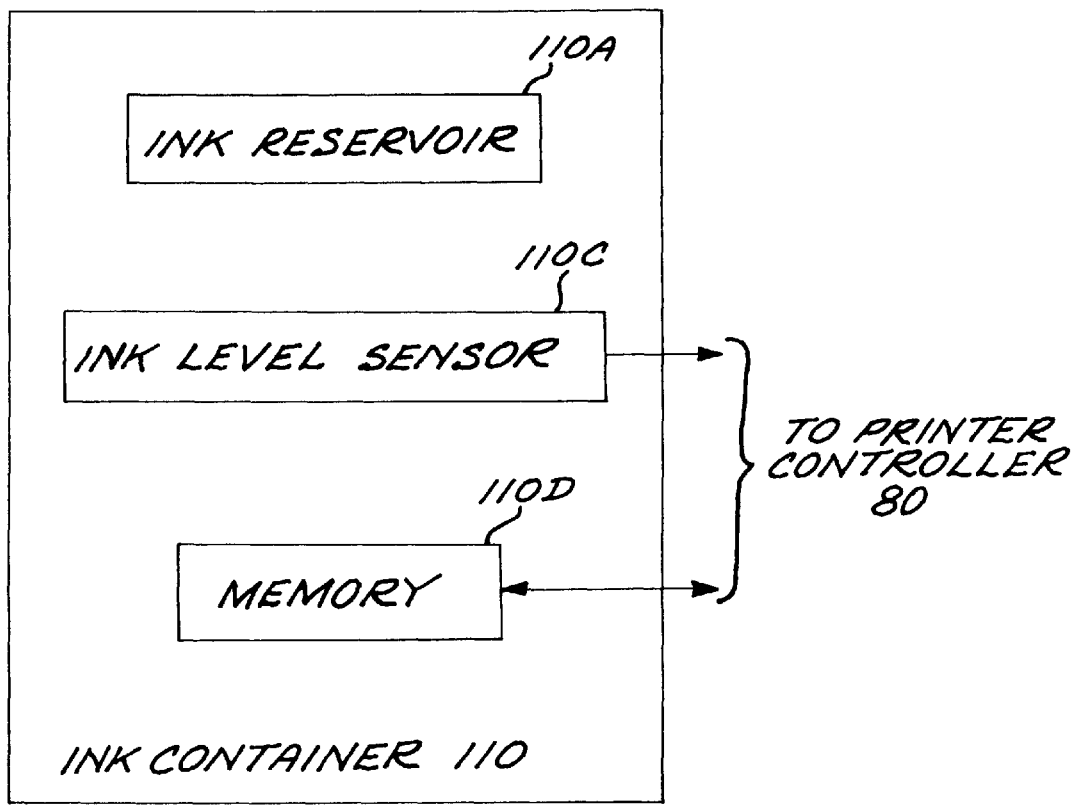
FIG. 4 is a schematic block diagram depicting major components of one of the ink containers of the printer/plotter system of FIG. 1.

By way of illustrative example, each of the ink containers 110–116 comprises an ink reservoir, an ink level sensing circuit, and an integral ink cartridge memory, as schematically depicted in FIG. 4 for the representative example of the ink container 110 which more particularly includes the ink reservoir 110A, an ink level sensing circuit 110C, and an integral ink cartridge memory 110D.

Continuing to refer to FIG. 1, the scanning print carriage 52, the print cartridges 60–66, and the ink containers 110–114 are electrically interconnected to a printer microprocessor controller 80 that includes printer electronics and firmware for the control of various printer functions, including analog-to-digital converter circuitry for converting the outputs of the ink level sensing circuits of the ink containers 110–116. The controller 80 thus controls the scan carriage drive system and the printheads on the print carriage to selectively energize the printheads, to cause ink droplets to be ejected in a controlled fashion on the print medium 40. The printer controller 80 further continually estimates remaining ink volume in each of the ink containers 110–114 pursuant to an ink level sensing circuit in accordance with the invention that is employed in each of the ink containers.

A host processor 82, which includes a CPU 82A and a software printer driver 82B, is connected to the printer controller 82. For example, the host processor 82 comprises a personal computer that is external to the printer 50. A monitor 84 is connected to the host processor 82 and is used to display various messages that are indicative of the state of the ink jet printer. Alternatively, the printer can be configured for stand-alone or networked operation wherein messages are displayed on a front panel of the printer.

Figure 5:
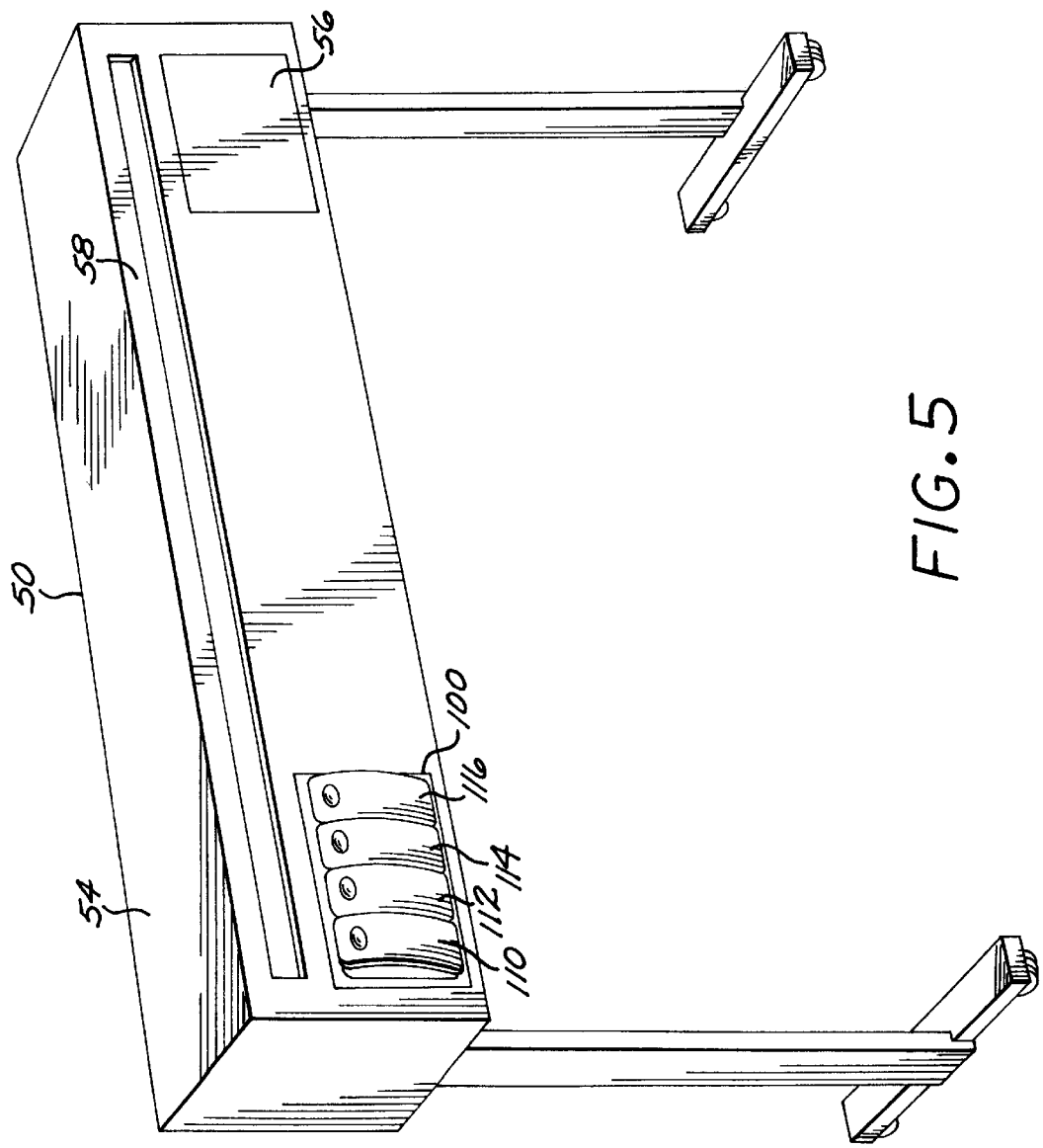
FIG. 5 a simplified isometric view of an implementation of the printer/plotter system of FIG. 1.

FIG. 5 shows in isometric view an exemplary form of a large format printer/plotter in which the invention can be employed, wherein four off-carriage ink containers 110, 112, 114, 116 are show in place in an ink supply station. The printer/plotter of FIG. 5 further includes a housing 54, a front control panel 56 which provides user control switches, and a media output slot 58. While this exemplary printer/plotter is fed from a media roll, it should be appreciated that alternative sheet feed mechanisms can also be used.

Referring now to FIGS. 6–13, schematically illustrated therein is a specific implementation of an ink container 200 which includes an ink level sensing circuit in accordance with the invention, and which can be implemented as each of the ink containers 110–116 which are structurally substantially identical.

As shown in FIGS. 6–7, the ink container 200 generally includes a pressure vessel 1102, a chassis member 1120 attached to a neck region 1102A at a leading end of the pressure vessel 1102, a leading end cap 1104 attached to the leading end of the pressure vessel, and a trailing end cap 1106 attached to the trailing end of the pressure vessel 1102.

Figure 8:
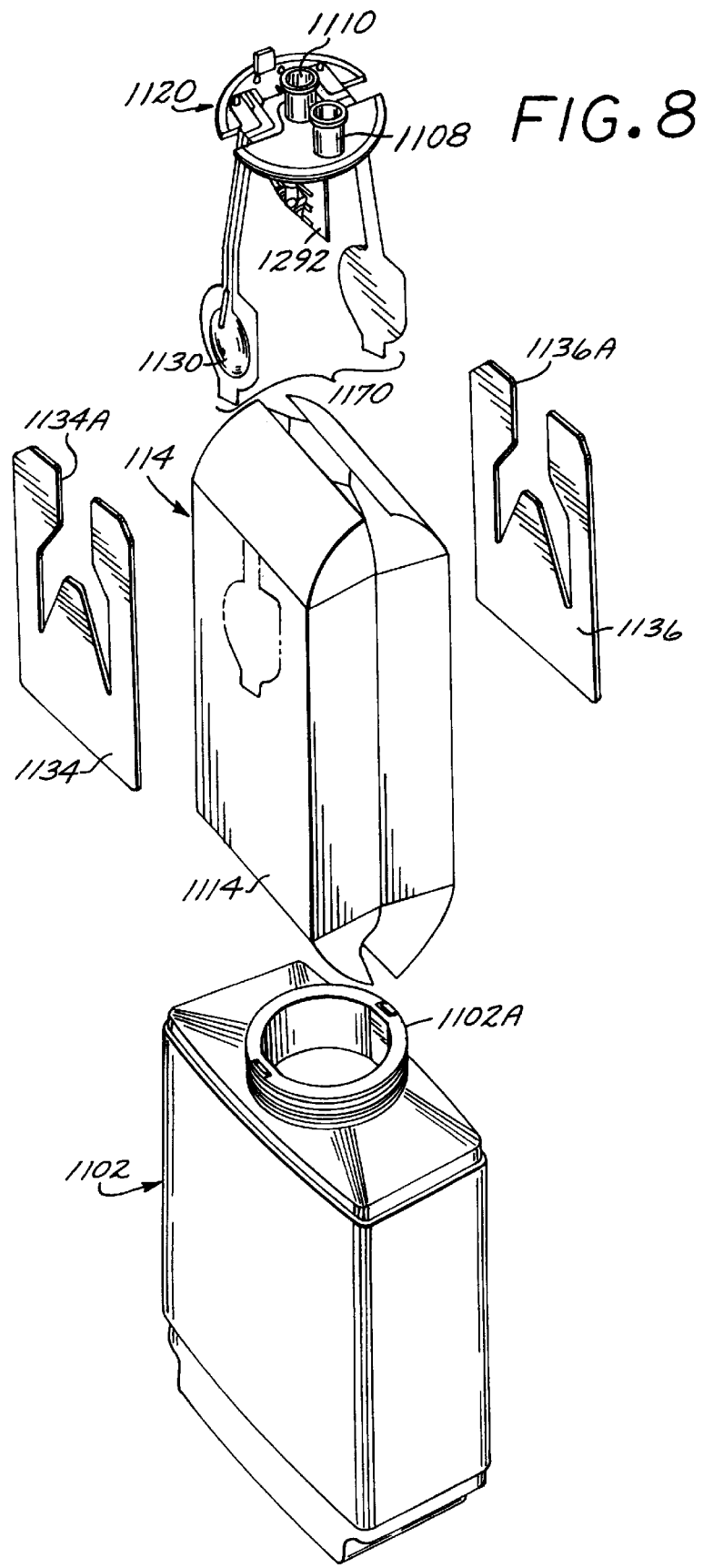
FIG. 8 is an exploded isometric view showing the pressure vessel, collapsible ink reservoir, ink level sensing circuitry, ink reservoir stiffening elements, and chassis member of the ink container of FIGS. 6 and 7.
Figure 9:
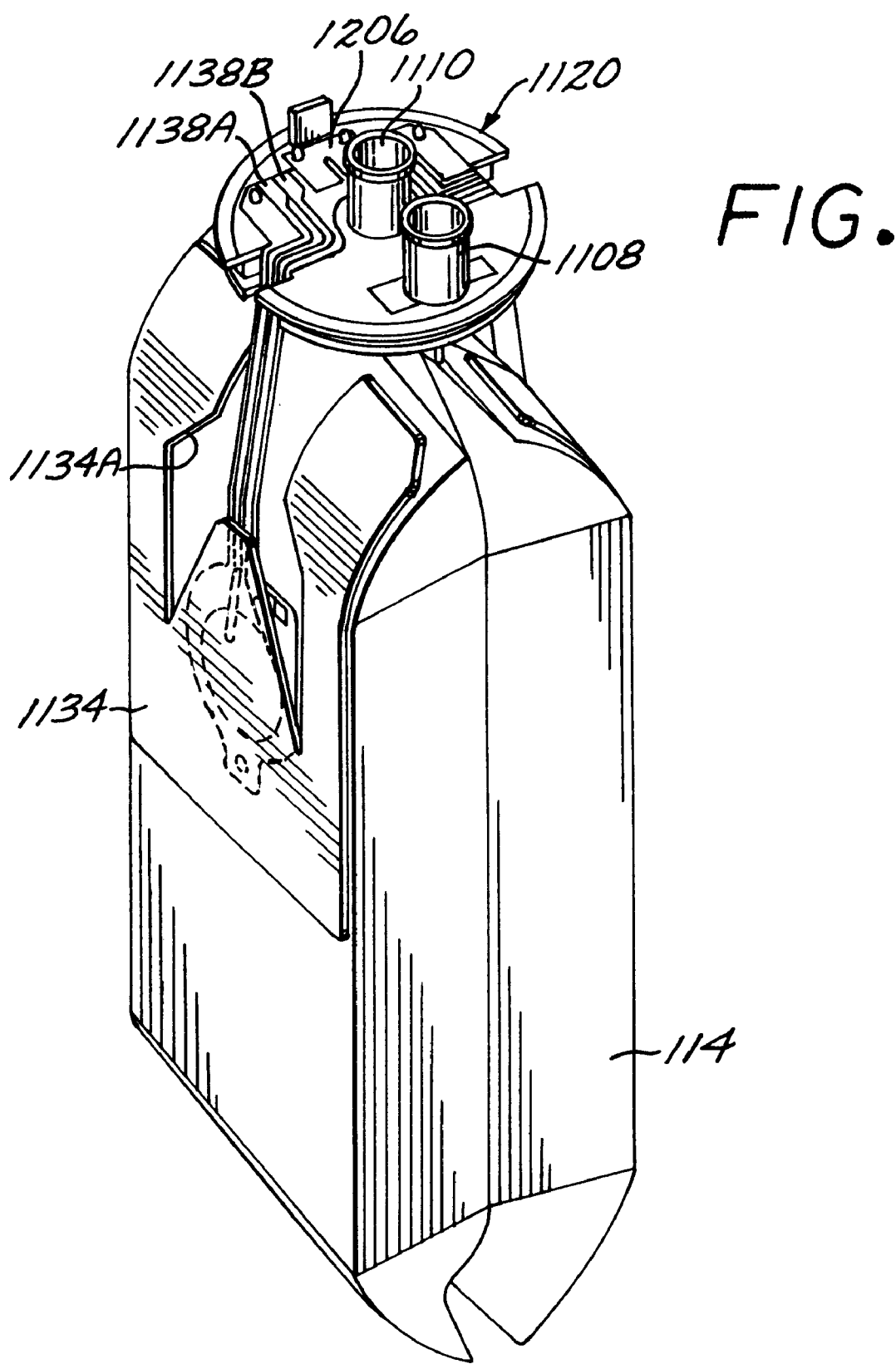
FIG. 9 is a schematic isometric view illustrating the collapsible ink reservoir, ink level sensing circuitry, ink reservoir stiffening elements, and chassis member of the ink container of FIGS. 6 and 7.
Figure 10:
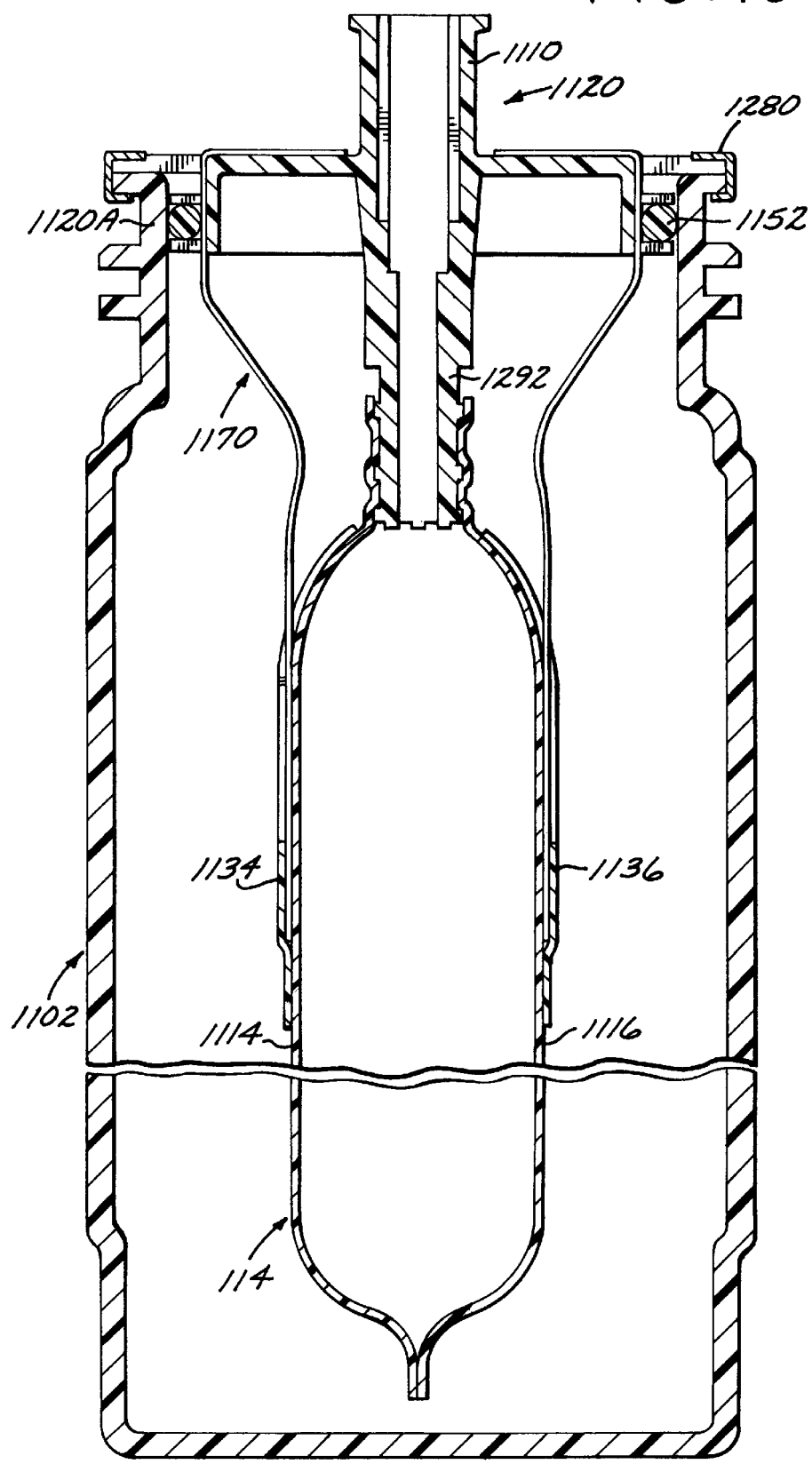
FIG. 10 is a cross-sectional view of the pressure vessel, collapsible ink reservoir, ink level sensing circuitry, ink reservoir stiffening elements, and chassis member of the ink container of FIGS. 6 and 7.

As more particularly shown in FIGS. 8–10, the ink container 200 further includes a collapsible ink bag or reservoir 114 disposed within the pressure vessel 1102, and an ink level sensing (ILS) circuit 1170 attached to the collapsible ink reservoir 114. The collapsible ink reservoir 114 is sealingly attached to a keel portion 1292 of the chassis 1120 which seals the interior of the pressure vessel 1102 from outside atmosphere while providing for an air inlet 1108 to the interior of the pressure vessel 1102, an ink outlet port 1110 for ink contained in the ink reservoir 114 and routing for conductive traces between the ink level sensing circuit 1170 and externally accessible contact pads disposed on the chassis member. The chassis 1120 is secured to the opening of the neck region 1102A of the pressure vessel 1102, for example by an annular crimp ring 1280 that engages a top flange of the pressure vessel and an abutting flange of the chassis member. A pressure sealing O-ring 1152 suitably captured in a circumferential groove on the chassis 1120 engages the inside surface of the neck region 1102A of the pressure vessel 1102.

The collapsible ink reservoir 114 more particularly comprises a pleated bag having opposing walls or sides 1114, 1116, and the ink level sensing circuit 1170 more particularly includes first and second substantially flat spiral inductive coils 1130, 1132 disposed on the opposing sides 1114, 1116.

In an exemplary construction, an elongated sheet of bag material is folded such that opposed lateral edges of the sheet overlap or are brought together, forming an elongated cylinder. The lateral edges are sealed together, and pleats are in the resulting structure generally in alignment with the seal of the lateral edges. The bottom or non-feed end of the bag is formed by heat sealing the pleated structure along a seam transverse to the seal of the lateral edges. The top or feed end of the ink reservoir is formed similarly while leaving an opening for the bag to be sealingly attached to the keel portion 1292 of the chassis 1120. By way of specific example, the ink reservoir bag is sealingly attached to keel portion 1292 by heat staking.

For reference purposes, the ink reservoir 114 has a longitudinal axis that extends from feed end to non-feed end, and is parallel to the axis of the ink outlet port 1110.

Stiffening elements 1134, 1136 are disposed on the opposing sides 1114, 1116 over the flat spiral inductive coils 1130, 1132 to enable a more predictable, consistent, and repeatable collapse of the ink reservoir 114 as the ink contained therein is depleted, to maintain the coils parallel to each other as the ink reservoir walls collapse toward each other while the remaining ink volume is in the range over which the ink level sensing circuit is active, and to reduce buckling of the ink reservoir in the region between the coils and the portion of the ink reservoir that is attached to the keel portion 1292. Maintaining the coils parallel to each other over a collapse range of interest with a more predictable, repeatable, and consistent collapse allows for more accurate sensing of ink remaining in the reservoir by adjacent the stiffening elements 1134, 1136. Pressurization within the pressure vessel also provides for more predictable and consistent collapse of the ink reservoir, with or without the stiffening elements 1134, 1136.

Figure 12:
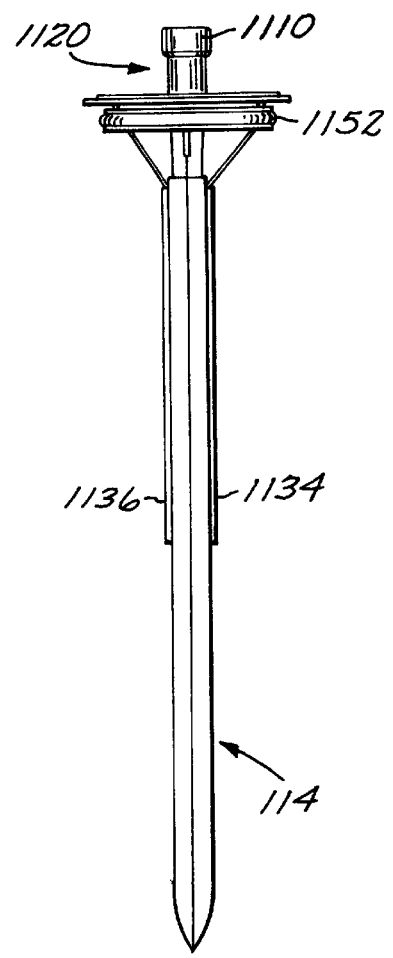
FIG. 12 an edge view of the collapsible ink reservoir, ink level sensing circuitry, ink reservoir stiffening elements, and chassis member of the ink container of FIGS. 6 and 7, with the collapsible ink reservoir in a flattened evacuated state.
Figure 11:
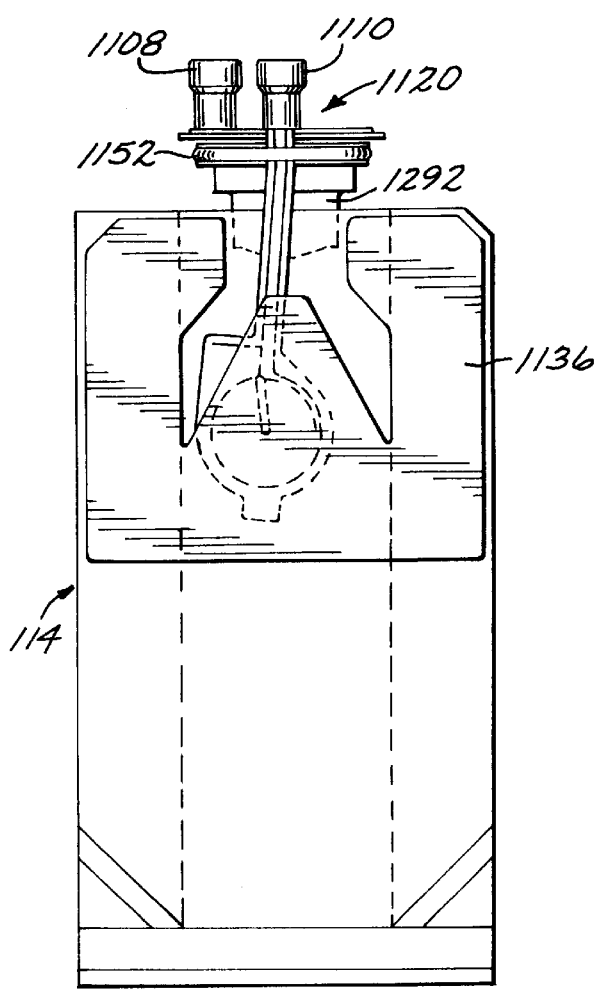
FIG. 11 is an elevational view of the collapsible ink reservoir, ink level sensing circuitry, ink reservoir stiffening elements, and chassis member of the ink container of FIGS. 6 and 7, with the collapsible ink reservoir in a flattened evacuated state.

The stiffeners generally extend over regions of the walls 1114, 1116 that can be flattened when the ink reservoir is empty and evacuated, as shown in FIGS. 11 and 12. Thus, for example, each of the stiffener 1134, 1136 extends laterally across the wall to which it is attached, and includes a cut-out 1134A, 1136A that provides clearance for folds, bumps or wrinkles in the walls 1114, 1116 caused by the keel portion 1292 and by the attachment of the ink reservoir to the keel portion 1292. Each stiffener further extends longitudinally from the feed end of the ink reservoir to a location slightly beyond the side of the coil that is away from the feed end of the ink reservoir. Limiting the extent of the stiffener from the feed end of the ink reservoir allows for the non-feed end of the ink reservoir to buckle as the ink reservoir collapses. In this manner, the stiffening elements reduce buckling of the walls 1114, 1116 between the coils and the feed end of the ink reservoir and allow buckling at the non-feed end of the ink reservoir.

For the particular implementation wherein the subassembly comprised of the ink reservoir, the ink level sensing circuit, and the stiffening elements need to be bent or curled into a C shaped configuration, as viewed along the longitudinal axis of the ink reservoir, for insertion into the pressure vessel, the stiffening elements 1134, 1136 are preferably flat resiliently deformable stiff sheets that return to a planar configuration in the absence of the biasing forces applied to bend the stiffening elements for insertion into the pressure vessel. In other words, the stiffening elements are stiff and yet sufficiently resilient so as to be not permanently deformed by the curling required for insertion into the pressure vessel. By way of illustrative example, the stiffening elements comprise relatively thin (e.g., 0.0005 inches) polyethylene terephthalate (PET) sheets.

The stiffening elements effectively cooperate with the walls of the ink reservoir to form wall regions of increased stiffness whose collapse with ink depletion is consistent and repeatable, and it should be appreciated that regions of the opposite walls 1114, 1116 of the ink reservoir can be formed as regions of increased stiffness in which case the stiffening elements 1134, 1136 can be omitted.

Each of the spiral coils 1130, 1132 can comprise a continuously curved winding having a perimeter that is generally defined by a conical section such as a circle or ellipse, for example, or each spiral coil can comprise a segmented winding comprised of serially connected segments having a perimeter that is generally defined by a polygon as a rectangle. The spiral coils 1130, 1132 are preferably positioned such that the line formed by their geometrical centers is orthogonal to the planes of the coils when the planes of the coils are parallel and when the ink reservoir is flat and without ink. In other words, the spiral coils 1130, 1132 are positioned such that their geometrical centers are substantially mirror images of each other on the walls 1114, 1116. In use, the container 200 is preferably rotationally positioned about its longitudinal axis, which extends between the open end thereof and the opposite closed end, such that the planes of the coils are vertical.

The areas of the stiffening elements 1134, 1136 (or rigid regions) are preferably greater than the areas of the respectively adjacent coils 1130, 1132. Also, the areas of the coils 1130, 1132 are respectively contained within the areas of the respectively adjacent stiffening elements 1134, 1136 (or rigid regions).

While the disclosed ink container 200 preferably includes pressurization, the ink level sensing circuit 1170 can be used without pressurization.

Figure 13:
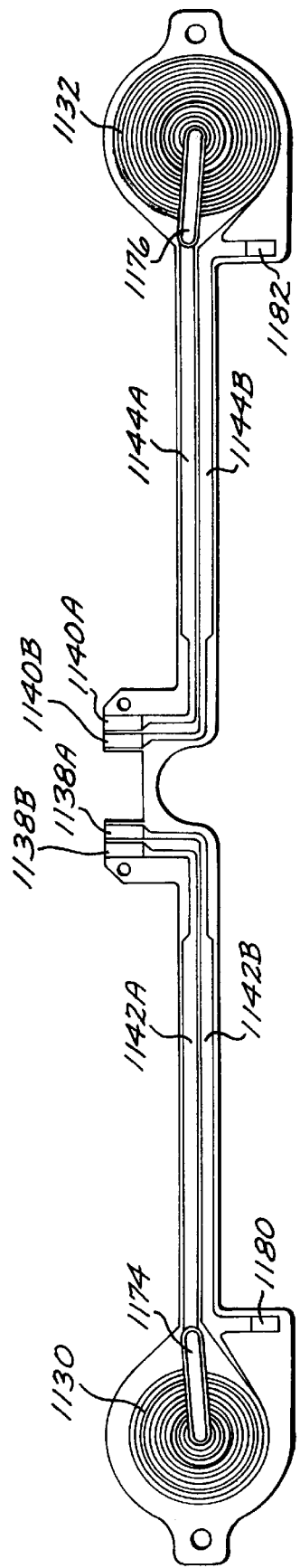
FIG. 13 is a schematic plan view of an implementation of the ink level sensing circuit of the invention as employed in the ink container of FIGS. 6 and 7.

As schematically illustrated in FIG. 13, the ink level sensing circuit 1170 is implemented, for example, as a flexible circuit wherein the flat coils 1130, 1132 and associated conductive elements by which the flat coils can be electrically accessed are disposed in laminar fashion between first and second flat unitary flexible substrates. In particular, the ink level sensing circuit further includes conductive leads 1142A, 1142B which extend between the flat coil 1130 and externally accessible contact pads 1138A, 1138B; and conductive leads 1144A, 1144B which extend between the flat coil 1132 and externally accessible contact pads 1140A, 1140B. The foregoing contact pads are exposed by respective openings in the appropriate flexible substrate of the flexible circuit, and are externally accessible in the sense that they can be conductively engaged by contact elements external to the ink container 200.

The externally accessible contact pads of the ink level sensing circuit are suitably disposed on the outside of the chassis 1120, and the conductive leads extend generally longitudinally within the pressure vessel 1102 from the chassis 1120 to the coils 1130, 1132. Portions of the conductive leads and associated portions of the flexible substrates of the ink level sensing circuit 1170 pass on the outside surface of the chassis between the O-ring 1152 and such outside surface. A suitably insulated jumper 1174 is connected between the conductive lead 1142A and the center of the flat coil 1130, while a suitable insulated jumper 1176 is connected between the conductive lead 1144A and the center of the flat coil 1132.

The ink level sensing circuit further includes ink leakage detectors comprised of conductive ink leakage detection pads 1180, 1182 respectively located adjacent the coils 1130, 1132 and respectively connected to conductive leads 1142B, 1144B. The ink leakage pads 1180, 1182 are exposed by openings in the outward facing flexible substrate of the ink sensing flexible circuit and are not covered by the stiffening elements 1134, 1136 so as to be contactable with any ink that accumulates in the pressure vessel 1102 as a result of ink leakage. Ink leakage, indicative of a broken ink reservoir, is detected for example by applying a voltage between the contact pad 1138B and a reference potential, and sensing the voltage between the contact pad 1140B and the reference potential. If the ink leakage contacts 1180, 1182 are immersed in ink, then the contact pad 1140B would be at a non-zero voltage; otherwise, the contact pad 1140B would be at zero volts. The ink leakage contact pads 1180, 1182 are preferably rotationally positioned relative to the coils 1130, 1132 so as to be elevationally low when the ink container is in its intended installed position.

By way of illustrative example, the coil portions and the contact portions of the flexible circuit comprising the ink level sensing circuit 1170 are attached to the walls 1114, 1116 and the chassis 1120 with pressure sensitive adhesive.

A memory chip package 1206 is also supported on the chassis 1120, for example between pairs of externally accessible ink level sensing circuit contact pads 1138A, 1138B and 1140A, 1140B. By way of illustrative example, the memory chip package includes memory access contacts which are connected to the print controller 82 when the ink container 200 is installed in the printing system 50, as are the externally accessible ink level sensing circuit contact pads 1138A, 1138B, 1140A, 1140B.

Further details as to a particular implementation of the ink container of FIGS. 6–13 are disclosed in commonly assigned co-pending U.S. Ser. No. 08/868,773, docket number 10970429, filed herewith, entitled "Ink Container Providing Pressurized Ink With Ink Level Sensor", incorporated herein by reference.

In use, the coils 1130, 1132 function as a non-contactive inductive transducer that indirectly senses the amount of ink in the ink reservoir by sensing the separation between the opposing walls 1114, 1116 which collapse toward each other as the ink supply is depleted. An AC excitation signal is passed through one coil (considered the input coil), inducing a voltage in the other coil (considered the output coil) whose magnitude increases as the separation decreases. The change in voltage in the output coil results from the change in the mutual inductance of the coils with change in the separation between the coils. The output voltage provided by the output coil is readily related to a corresponding ink volume, e.g., by values stored in the ink container memory.

A particular technique for energizing the input coil and sensing the output of the output coil is disclosed in previously identified U.S. Ser. No. 08/633,613, filed Apr. 17, 1996, docket number 10951138, entitled "Inductive Ink Level Detection Mechanism For Ink Supplies", incorporated herein by reference.

Preferably, the coils 1130, 1132 are positioned in areas of the ink reservoir that are subject to predictable, consistent and repeatable collapse. Further, the coils 1130, 1132 are positioned such that the ink level sensing circuit 1170 is active over a desired range of ink volume. For example, if it is desired that the ink level sensing circuit be active over an ink volume range that is within the lower half of the available ink volume, and wherein the feed end of the chassis or feed end of the container is elevationally lower than the opposite end when the container is in its installed position, the spiral coils 1130, 1132 are positioned closer to the ink outlet 1110, for example between the feed end of the reservoir which is attached to the chassis 1120 and the middle between the feed end of the ink reservoir and the opposite end. By way of illustrative example, the ink container 200 can be installed with the longitudinal axis of the container being tilted relative to horizontal by an angle in the range of about 5 to 30 degrees such that the chassis is elevationally lower that the opposite of the ink container, and with the ink container rotationally positioned about the longitudinal axis so that the planes of the ink level sensing coils are vertical.

Also, the coils can be positioned slightly off the lateral middle (wherein the lateral direction is orthogonal to the longitudinal direction) for installations wherein longitudinal axis of the ink reservoir is more horizontal than vertical. For example, for an installation wherein the longitudinal axis of the ink reservoir is about 15 degrees relative to horizontal with the feed end of the reservoir being lower than the non-feed end, the ink level sensing coils can be displaced toward what would be the elevationally higher edge of the walls 1114, 1116 by about 4 degrees, for example, whereby the coils are tilted up in the installed position relative to the longitudinal axis of the ink reservoir.

By way of further illustrative example, without limitation as to the relative number of turns contained in the coils, the coil area of the coil 1132, as the output coil, is larger than the coil area of the coil 1130, as the input coil, in at least one direction and not smaller than the coil area of the coil 1130 in any direction, such that if the output coil area and the input coil area were superimposed, the output coil area would completely overlap the input coil area and extend beyond the input coil area in at least one direction, wherein the coil area of a coil is the area occupied by the turns of the coil and the gap between adjacent turns. A coil area can be also considered as the area enclosed by the periphery of a coil. In other words, the input coil area can be completely contained within the output coil area, if such areas were placed on top of each other. For example, the output coil area and input coil can be similarly shaped (i.e., of the same shape), and the output coil area would have a bigger shape. For the particular example of generally circular coils, the coil area of the output coil has a radius that is greater than the radius of the coil area of the input coil. As another particular example, for generally rectangular coils, the output coil area would have a width that is greater than the width of the input coil, and a length that is greater than or equal to the length of the input coil. Broadly, the input coil area is completely containable within the output coil area which greater than the input coil area in at least one dimension or direction.

As a further example, the coil 1132, as the output coil, includes a greater number of turns than the coil 1130, as the input coil, without limitation as to the relative areas of the coils.

A larger output coil area that completely contains the input coil area and extends beyond the output coil area in at least one direction increases the tolerance in the alignment between the coils 1130, 1132 in at least one direction, which allows for easier manufacture. A larger number of turns in the output coil increases the level of the voltage of the coil output, which increases the accuracy of ink volume sensing.

The foregoing has thus been a disclosure of ink level sensing apparatus that provides accurate and reliable ink level information, and advantageously avoids contact with ink.

Although the foregoing has been a description and illustration of specific embodiments of the invention, various modifications and changes thereto can be made by persons skilled in the art without departing from the scope and spirit of the invention as defined by the following claims.

What is claimed is:

1. An ink level detection system, comprising:
   a collapsible ink reservoir having first a side and a second side that are opposing;
   a first inductive coil attached to said first side, said first inductive coil having a first coil area, and first and second terminals; and
   a second inductive coil attached to said second side, said second inductive coil having a second coil area, and having first and second terminals;
   transverse to said first side and said second side such that said second coil area completely overlaps said first coil area.

2. The ink level detecting system of claim 1 wherein said first side includes a first region of increased stiffness adjacent said first inductive coil, and wherein said second side includes a second region of increased stiffness adjacent said second inductive coil.

3. The ink level detecting system of claim 2 wherein said first region of increased stiffness has an area that is larger than said first coil area, and wherein said second region of increased stiffness has an area that is larger than said first coil area.

4. The ink level detection system of claim 2 wherein said first region of increased stiffness includes a first stiffening element, and wherein said second region of increased stiffness includes a second stiffening element.

5. The ink level detection system of claim 1 wherein said first and second terminals of said first inductive coil receive an input signal, and wherein said first and second terminals of said second inductive coil provide an output signal.

6. The ink level detection system of claim 5 wherein said first inductive coil includes a first number of turns and said second inductive coil includes a second number of turns, and wherein said second number of turns is greater than said first number of turns.

7. The ink level detection system of claim 1 wherein said first inductive coil and said second inductive coil comprise conductive traces on a flexible substrate.

8. The ink level detection system of claim 1 further including:
   a first ink leakage detection pad electrically connected to one of said first and second terminals of said first inductive coil; and
   a second ink leakage detection pad electrically connected to one of said first and second terminals of said second inductive coil.

9. The ink level detection system of claim 1 further including a pressurizable vessel enclosing said collapsible ink reservoir.

10. An ink level detection system, comprising:
    a collapsible ink reservoir having a first side and a second side that are opposing;
    a first inductive coil attached to said first side, said first inductive coil having a first coil area, and first and second terminals;
    a second inductive coil attached to said second side, said second inductive coil having a second coil area, and first and second terminals;
    said first side including a first region of increased stiffness adjacent said first inductive coil; and
    said second side including a second region of increased stiffness adjacent said second inductive coil.

11. The ink level detection system of claim 10 wherein said first region of increased stiffness has an area that is greater than said first coil area, and wherein said second region of increased stiffness has an area that is greater than said second coil area.

12. The ink level detection system of claim 11 wherein said first region of increased stiffness includes a first stiffening element, and wherein said second region of increased stiffness includes a second stiffening element.

13. The ink level detection system of claim 10 wherein said first inductive coil includes a first number of turns and receives an input signal at first and second terminals of said first inductive coil, and wherein said second inductive coil includes a second number of turns that is greater than said first number of turns and provides an output signal at first and second terminals of said second inductive coil.

14. The ink level detection system of claim 13 wherein said second coil area is greater than said first coil area and completely contains said first coil area.

15. The ink level detection system of claim 13 wherein said first inductive coil and said second inductive coil comprise conductive traces on a flexible substrate.

16. The ink level detection system of claim 10 further including:
    a first ink leakage detection pad electrically connected to one of said first and second terminals of said first inductive coil; and
    a second ink leakage detection pad electrically connected to one of said first and second terminals of said second inductive coil.

17. The ink level detection system of claim 10 further including a pressurizable vessel enclosing said collapsible ink reservoir.

18. An ink level detection system, comprising:
    a collapsible ink reservoir having a first side and a second side that are opposing;
    a first inductive coil attached to said first side, said first inductive coil having a first coil area and a first number of turns; and
    a second inductive coil attached to said second side, said second inductive coil having a second coil area and a second number of turns;
    said second number of turns being greater than said first number of turns.

19. The ink level detecting system of claim 18 wherein said first side includes a first region of increased stiffness adjacent said first inductive coil, and wherein said second side includes a second region of increased stiffness adjacent said second inductive coil.

20. The ink level detecting system of claim 19 wherein said first region of increased stiffness has an area that is larger than said first coil area, and wherein said second region of increased stiffness has an area that is larger than said second coil area.

21. The ink level detection system of claim 19 wherein said first region of increased stiffness includes a first stiffening element, and wherein said second region of increased stiffness includes a second stiffening element.

22. The ink level detection system of claim 18 wherein said first inductive coil and said second inductive coil comprise conductive traces on a flexible substrate.

23. The ink level detection system of claim 18 further including:
- a first ink leakage detection pad electrically connected to one of said first and second terminals of said first inductive coil; and
- a second ink leakage detection pad electrically connected to one of said first and second terminals of said second inductive coil.

24. The ink level detection system of claim 18 further including a pressurizable vessel enclosing said collapsible ink reservoir.

25. An ink level detection system, comprising:
- a collapsible ink reservoir having a first side and a second side that are opposing;
- a first inductive coil attached to said first side, said first inductive coil having a first coil area, and first and second terminals;
- a second inductive coil attached to said second side, said second inductive coil having a second coil area, and first and second terminals;
- said first side including a first region of increased stiffness adjacent said first inductive coil and having an area that is larger than said first coil area;
- said second side including a second region of increased stiffness adjacent said second inductive coil and having an area that is larger than said second coil area; and
- a pressure vessel enclosing said collapsible ink reservoir.

26. The ink level detection system of claim 25 wherein said first region of increased stiffness includes a first stiffening element, and wherein said second region of increased stiffness includes a second stiffening element.

27. The ink level detection system of claim 25 wherein said first inductive coil and said second inductive coil comprise conductive traces on a flexible substrate.

28. The ink level detection system of claim 25 further including:
- a first ink leakage detection pad electrically connected to one of said first and second terminals of said first inductive coil; and
- a second ink leakage detection pad electrically connected to one of said first and second terminals of said second inductive coil.

* * * * *